(12) United States Patent
Francisco et al.

(10) Patent No.: US 11,923,503 B2
(45) Date of Patent: Mar. 5, 2024

(54) BROMINE AND IODINE LITHIUM PHOSPHOROUS SULFIDE SOLID ELECTROLYTE AND SOLID-STATE BATTERY INCLUDING THE SAME

(71) Applicant: Solid Power Operating, Inc., Louisville, CO (US)

(72) Inventors: Brian E. Francisco, Boulder, CO (US); Benjamin Carlson, Minneapolis, MN (US)

(73) Assignee: Solid Power Operating, Inc., Louisville, CO (US)

( * ) Notice: Subject to any disclaimer, the term of this patent is extended or adjusted under 35 U.S.C. 154(b) by 117 days.

(21) Appl. No.: 17/203,160

(22) Filed: Mar. 16, 2021

(65) Prior Publication Data

US 2022/0021021 A1   Jan. 20, 2022

Related U.S. Application Data

(60) Provisional application No. 62/990,135, filed on Mar. 16, 2020.

(51) Int. Cl.
| | |
|---|---|
| *H01M 10/0562* | (2010.01) |
| *C03C 10/16* | (2006.01) |
| *H01M 10/0525* | (2010.01) |
| *H01M 10/058* | (2010.01) |

(52) U.S. Cl.
CPC ......... *H01M 10/0562* (2013.01); *C03C 10/16* (2013.01); *H01M 10/0525* (2013.01); *H01M 10/058* (2013.01); *H01M 2300/0068* (2013.01)

(58) Field of Classification Search
CPC ......... H01M 10/0562; H01M 10/0525; H01M 10/058; C03C 10/16

USPC ......................................................... 429/322
See application file for complete search history.

(56) References Cited

U.S. PATENT DOCUMENTS

| | | | | |
|---|---|---|---|---|
| 2014/0302382 | A1* | 10/2014 | Kambara | H01M 10/0562 |
| | | | | 429/321 |
| 2017/0149086 | A1* | 5/2017 | Du | H01M 10/0525 |
| 2018/0287204 | A1 | 10/2018 | Kanno et al. | |
| 2018/0351148 | A1* | 12/2018 | Schneider | C01B 25/14 |
| 2019/0312304 | A1* | 10/2019 | Uesugi | H01B 1/06 |

(Continued)

FOREIGN PATENT DOCUMENTS

| | | |
|---|---|---|
| WO | 20180183365 A1 | 10/2018 |
| WO | WO-2020045633 A1 * | 3/2020 ............. C01B 25/14 |

OTHER PUBLICATIONS

Sun et al., Superionic Conductors: Li10+δ[SnySi1-y]1+δP2-δS12 with a Li10GeP2S12-type Structure in the Li3PS4-Li4SnS4-Li4SiS4 Quasi-ternary System, Jul. 2017, Chemistry of Materials, 29, 5858-5864 (Year: 2017).*

(Continued)

*Primary Examiner* — Sean P Cullen
(74) *Attorney, Agent, or Firm* — Polsinelli PC; Gregory P. Durbin

(57) ABSTRACT

A solid electrolyte material comprises Li, T, X and A wherein T is at least one of P, As, Si, Ge, Al, Sb, W, and B; X is one or more halogens and/or N; A is one or more of S or Se. The solid electrolyte material has peaks at 14.9°±0.50°, 20.4°±0.50°, and 25.4°±0.50° in X-ray diffraction measurement with Cu—Kα(1,2)=1.5418Å and may include glass ceramic and/or mixed crystalline phases.

8 Claims, 3 Drawing Sheets

(56) References Cited

U.S. PATENT DOCUMENTS

2019/0319305 A1    10/2019  Utsuno et al.
2019/0348707 A1*   11/2019  Ito ...................... H01M 10/052
2021/0218056 A1*    7/2021  Fukushima ............. H01M 4/13

OTHER PUBLICATIONS

Hanghofer et al., Substitutional disorder: structure and ion dynamics of the argyrodites Li6PS5Cl, Li6PS5Br and Li6PS5I, Mar. 2019, Physical Chemistry Chemical Physics, 21, 8489-8507 (Year: 2019).*
PCT Application No. PCT/US21/22562, International Search Report and Written Opinion, dated Jun. 3, 2021, 14 pages.

* cited by examiner

BROMINE AND IODINE LITHIUM PHOSPHOROUS SULFIDE SOLID ELECTROLYTE AND SOLID-STATE BATTERY INCLUDING THE SAME

CROSS-REFERENCE TO RELATED APPLICATION

This application claims the benefit of priority U.S. Provisional Application No. 62/990,135, filed on Mar. 16, 2020, the entirety of which is incorporated herein by reference.

FIELD

Various embodiments described herein relate to the field of solid-state primary and secondary electrochemical cells, electrodes and electrode materials, electrolyte and electrolyte compositions and corresponding methods of making and using same.

BACKGROUND

The ever-increasing number and diversity of mobile devices, the evolution of hybrid/electric automobiles, and the development of Internet-of-Things devices is driving greater need for battery technologies with improved reliability, capacity (Ah), thermal characteristics, lifetime and recharge performance. Currently, although lithium solid-state battery technologies offer potential increases in safety, packaging efficiency, and enable new high-energy chemistries, additional improvements are needed.

In electrochemical cells, iodine containing materials can provide stability to lithium metal anodes [Rangasamy, E.; Liu, Z.; Gobet, M.; Pilar, K.; Sahu, G.; Zhou, W.; Wu, H.; Greenbaum, S.; Liang, C. An Iodide-Based $Li_7P_2S_8I$ Superionic Conductor. *J Am Chem Soc* 2015, 137 (4), 1384-1387.]. However, the most common iodine-containing solid electrolyte ($Li_6PS_5I$) has low conductivity (1E-4 mS/cm at room temperature) [Boulineau, S.; Courty, M.; Tarascon, J.-M.; Viallet, V. Mechanochemical Synthesis of Li-Argyrodite $Li_6PS_5X$ (X═Cl, Br, I) as Sulfur-Based Solid Electrolytes for All Solid State Batteries Application. Solid State Ionics 2012, 221, 1-5.].

Furthermore, common electrolytes for electrochemical cells, such as those from the Argyrodite family, require a high temperature (500° C.) heat treatment [Boulineau et al, *Solid State Ionics* 2012, 221, 1-5] to obtain crystalline material of high conductivity. This high temperature treatment adds complexity and cost to manufacturing of the solid electrolyte and electrochemical cell.

Thus, there is a need for an electrochemical cell, which has excellent conductivity and is economically produced. The present disclosure addresses this need by describing such a solid electrolyte material and method of production.

SUMMARY

In an embodiment, a solid electrolyte material comprises elements Li, T, X and A wherein T is at least one element selected from the group consisting of P, As, Si, Ge, Al, Sb, W, and B; X is at least one element selected from the group consisting of F, Cl, Br, I, and N; A is one or more of elements S and Se. The solid electrolyte material has peaks at 2θ=14.9°±0.50°, 20.4°±0.50°, and 25.4°±0.50° in X-ray diffraction measurement with Cu—Kα(1,2)=1.5418 Å and may include glass ceramic and/or mixed crystalline phases.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

In the following description, specific details are provided to impart a thorough understanding of the various embodiments of the invention. Upon having read and understood the specification, claims and drawings hereof, however, those skilled in the art will understand that some embodiments of the disclosure may be practiced without hewing to some of the specific details set forth herein. Moreover, to avoid obscuring the disclosure, some well-known methods, processes, devices, and systems finding application in the various embodiments described herein are not disclosed in detail.

Figure 1:
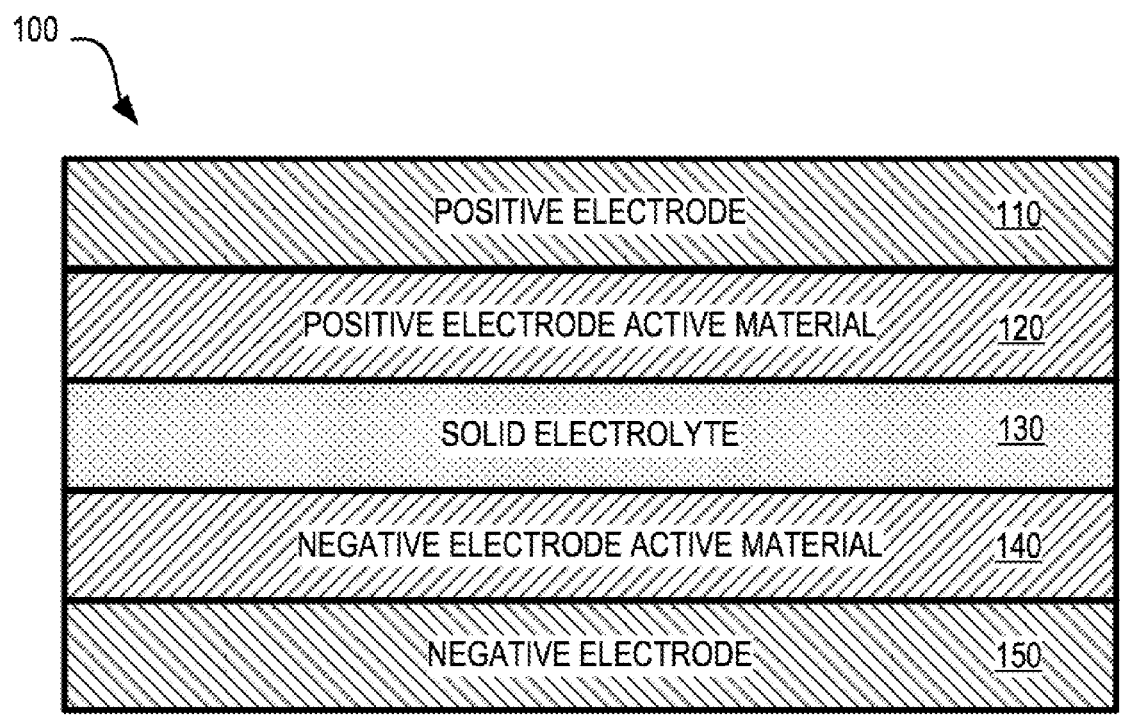
FIG. 1 is a schematic sectional view of an exemplary construction of a lithium solid-state electrochemical cell including a solid electrode composition, in accordance with an embodiment.

FIG. 1 is a schematic sectional view of an exemplary construction of a lithium solid-state electrochemical cell including an electrode composition of the present disclosure. Lithium solid-state battery 100 includes positive electrode (current collector) 110, positive electrode active material layer (cathode) 120, solid electrolyte layer 130, negative electrode active material layer (anode) 140, and negative electrode (current collector) 150. Solid electrolyte layer 130 may be formed between positive electrode active material layer 120 and negative electrode active material layer 140. Positive electrode 110 electrically contacts positive electrode active material layer 120, and negative electrode 150 electrically contacts negative electrode active material layer 140. The solid electrolyte compositions described herein may form portions of positive electrode active material layer 120, negative electrode active material layer 140, and solid electrolyte layer 130.

Positive electrode 110 may be formed from materials including, but not limited to, aluminum, nickel, titanium, stainless steel, or carbon. Similarly, negative electrode 150 may be formed from materials including, but not limited to, copper, nickel, stainless steel, or carbon. Negative electrode 150 may be omitted entirely if negative electrode active material 140 possesses adequate electronic conductivity and mechanical strength. Positive electrode active material layer 120 may include, at least, a positive electrode active material including, but not limited to, metal oxides, metal phosphates, metal sulfides, sulfur, lithium sulfide, oxygen, or air, and may further include a solid electrolyte material such as the solid electrolyte compositions described herein, a conductive material and/or a binder. Examples of the conductive material include, but are not limited to, carbon (carbon black, graphite, carbon nanotubes, carbon fiber, graphene), metal particles, filaments, or other structures. Examples of the binder include, but are not limited to, polyvinyl chloride (PVC) polyanilene, poly(methyl methacrylate) ("PMMA"), nitrile butadiene rubber ("NBR"), styrene-butadiene rubber (SBR), PVDF, or polystyrene. Positive electrode active material layer 120 may include solid electrolyte compositions as described herein at, for example, 5% by volume to 80% by volume. The thickness of positive electrode active material layer 120 may be in the range of, for example, 1 μm to 1000 μm.

Negative electrode active material layer 140 may include, at least, a negative electrode active material including, but not limited to, lithium metal, lithium alloys, silicon (Si), tin (Sn), graphitic carbon, hard carbon, and may further include a solid electrolyte material, such as the solid electrolyte compositions described herein, a conductive material and/or a binder. Examples of the conductive material may include those materials used in the positive electrode material layer. Examples of the binder may include those materials used in the positive electrode material layer. Negative electrode active material layer 140 may include solid electrolyte compositions as described herein at, for example, 5% by volume to 80% by volume. The thickness of negative electrode active material layer 140 may be in the range of, for example, 1 μm to 1000 μm.

Solid electrolyte material included within solid electrolyte layer 130 is solid electrolyte compositions as described herein. Solid electrolyte layer 130 may include solid electrolyte compositions as described herein in the range of 10% by volume to 100% by volume, for example. Further, solid electrolyte layer 130 may contain a binder or other modifiers. Examples of the binder may include those materials used in the positive electrode material layer as well as additional self-healing polymers and poly(ethylene) oxide (PEO). A thickness of solid electrolyte layer 130 is in the range of 1 μm to 1000 μm.

Although indicated in FIG. 1 as a lamellar structure, it is well known that other shapes and configurations of solid-state electrochemical cells are possible. Most generally, a lithium solid-state battery may be produced by providing a positive electrode active material layer, a solid electrolyte layer, and a negative electrode active material layer sequentially layered and pressed between electrodes and provided with a housing.

Figure 2:
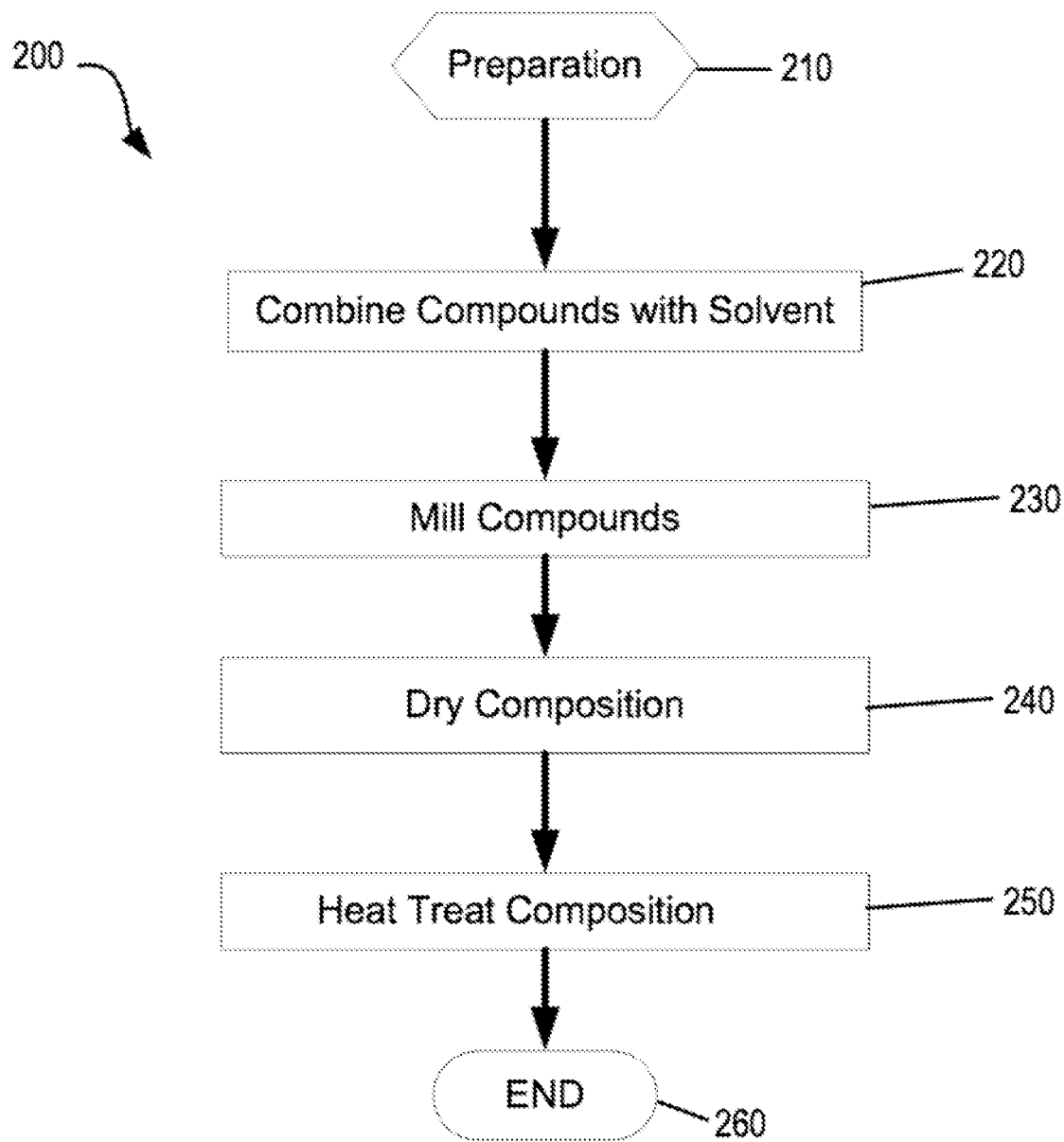
FIG. 2 is a flow chart of a process for producing a solid electrolyte composition, in accordance with an embodiment.

FIG. 2 is a flow chart of a process for producing a solid electrolyte composition useful for the construction of secondary electrochemical cells. Process 200 begins with preparation step 210 wherein any preparation action, such as precursor synthesis, purification, and equipment preparation may take place. After any initial preparation, process 200 advances to step 220 wherein sulfur compounds, lithium compounds and other compounds, such as described herein, may be combined with an appropriate solvent and/or other liquids. Exemplary sulfur compounds may include, for example, elemental sulfur, phosphorus pentasulfide ($P_2S_5$), and lithium sulfide ($Li_2S$), typically in powder forms. Exemplary lithium compounds may include, for example, lithium metal (Li), lithium sulfide ($Li_2S$), lithium bromide (LiBr), and lithium iodide (LiI), typically in powder forms. Exemplary solvents may include, for example, but are not limited to, aprotic chain hydrocarbons, such as heptane, aromatic hydrocarbons, such as xylenes, and other solvents with a low propensity to generate hydrogen sulfide gas in contact with precursors or final electrolyte composition. The solvent is not particularly limited as long as it remains in the liquid state in part or in whole during the milling process at the desired milling temperature and does not participate in deleterious reactions with the solid electrolyte precursors or final solid electrolyte composition. The ratios and amounts of the various compounds is not specifically limited as long as the combination permits the synthesis of the desired composition and phase, as indicated by the presence of specific X-ray diffraction features. The ratios and amounts may also vary according to specific synthesis conditions. For example, the ratio of solvent volume to precursor mass may need to be adjusted as solid electrolyte composition is adjusted to ensure complete milling of the precursors to generate the desired solid electrolyte phase discussed herein.

The amount of solvent added to the combination is not limited as long as the amount supports synthesis of the desired composition of solid electrolyte material. Multiple solvents may be mixed together with the noted compounds. Additional materials, such as co-solvents or polymers, may also be added during this step. Furthermore, the synthesis may be carried out with no solvent.

Next, in step 230 the composition may be mixed and/or milled for a predetermined period of time and temperature in order to create a solid electrolyte, as described above. Mixing time is not specifically limited as long as it allows for appropriate homogenization and reaction of precursors to generate the solid electrolyte. Mixing temperature is not specifically limited as long as it allows for appropriate mixing and is not so high that a precursor enters the gaseous state. For example, appropriate mixing may be accomplished over 10 minutes to 60 hours and at temperatures from 20 to 120 degrees Celsius. Mixing may be accomplished using, for example, a planetary ball-milling machine or an attritor mill.

Next, in step 240, the composition may be dried in an inert atmosphere, such as argon or nitrogen or under vacuum for a predetermined period of time and temperature. Following drying, heat treatment to crystallize the dried material may be performed during step 250. The temperature of heat treatment is not particularly limited, as long as the temperature is equal to or above the crystallization temperature required to generate the crystalline phase of the present disclosure. The material resulting from heat treatment step 250 may be single phase, and may also contain other crystalline and non-crystalline phases and minor fractions of precursor phases. The described process requires only modest heat treatment at 200-220° C.

Generally, the heat treatment time is not limited as long as the heat treatment time allows production of the desired composition and phase. The time may be in the range of, for example, one minute to 24 hours. Further, the heat treatment is conducted in an inert gas atmosphere (e.g., Argon) or under vacuum.

In final step 260, a completed composition may be utilized in the construction of electrochemical cells such as the cell of FIG. 1.

Other synthesis routes may be used as well. For example, a method comprising the mixing of suitable precursors providing components Li, T, X, and A in a solvent capable of causing reaction between the precursors, removal of the solvent, and heat treatment at a temperature equal to or greater than the crystallization temperature of the material may be used to synthesize the solid electrolyte material discussed herein.

An exemplary embodiment is a method for producing a sulfide solid electrolyte material including glass ceramics comprising Li, T, X and A wherein T is at least one element selected from a group consisting of P, As, Si, Ge, Al, Sb, W, and B; X is at least one element selected from a group consisting of F, Cl, Br, I and N; A is one or more of elements S or Se; the method comprising (a) mixing and milling a raw material composition containing an element A or compound $Li_2A$, an element T or sulfide of T, and a compound LiX or Li$_3$N to render the mixture an amorphous sulfide glass under x-ray diffraction; and (b) heating the sulfide glass at a heat treatment temperature equal to or greater than a crystallization temperature of the sulfide glass to synthesize the glass ceramics having peaks at 14.9°±0.50°, 20.4°±0.50°, and 25.4°±0.50° in X-ray diffraction measurement with Cu—Kα (1,2)=1.5418 Å.

EXAMPLE 1

Precursors including 12.9789 g Li$_2$S (Lorad Chemical Corporation), 26.9636 g P$_2$S$_5$ (Sigma-Aldrich Co.), 1.4033 g LiBr (Sigma-Aldrich Co.), and 8.6542 g LiI (Sigma-Aldrich Co.), are added to a 500 ml zirconia milling jar with zirconia milling media and compatible solvent (e.g. xylenes or heptane). The mixture is milled in a Retsch PM 100 planetary mill for 12 hours at 400 RPM. The material is collected and dried at 70° C. and then heated to 210° C. in inert (argon, nitrogen, or vacuum) environment. This procedure results in the synthesis of the desired novel phase. The resulting powder can then be used in a positive electrode active material layer, solid electrolyte layer, and/or negative electrode active material layer.

EXAMPLE 2

Precursors including 13.0188 g Li$_2$S (Lorad Chemical Corporation), 27.0465 g P$_2$S$_5$ (Sigma-Aldrich Co.), and 10.8510 g LiI (Sigma-Aldrich Co.), are added to a 500 ml zirconia milling jar with zirconia milling media and xylenes. The mixture is milled in a Retsch PM 100 planetary mill for 12 hours at 400 RPM. The material is collected and dried at 70° C. and then heated to 210° C. in an argon environment. This procedure results in the synthesis of a composite comprising the desired novel phase and an additional electrolyte phase.

EXAMPLE 3

Precursors including 14.0726 g Li$_2$S (Lorad Chemical Corporation), 29.2358 g P$_2$S$_5$ (Sigma-Aldrich Co.), and 7.6079 g LiBr (Sigma-Aldrich Co.), are added to a 500 ml zirconia milling jar with zirconia milling media and xylenes. The mixture is milled in a Retsch PM 100 planetary mill for 12 hours at 400 RPM. The material is collected and dried at 70° C. and then heated to 205° C. in an argon environment. This procedure does not result in the synthesis of the desired phase and instead yields a composite comprising a less desirable electrolyte phase and unreacted precursor material.

The sulfide solid electrolyte material resulting from Example 1 comprises Li, T, X, and A, and has peaks at 2θ=14.9°±0.50°, 20.4°±0.50°, and 25.4°±0.50° in X-ray diffraction (XRD) measurement with Cu—Kα(1,2)=1.5418 Å, which identify the novel crystalline phase of the solid electrolyte. T comprises at least one of P, As, Si, Ge, Al, Sb, W, and B; A comprises at least one of S or Se, and X is comprised of F, Cl, Br, I, and/or N. The general chemical composition may be denoted as Li$_{1-a-b-c-d}$P$_a$T$_b$A$_c$X$_d$; where values for a, b, c, and d may be in the ranges 0≤a≤0.150, 0≤b≤0.176, 0.364≤c≤0.603, 0.019≤d≤0.080, or in another embodiment, in the ranges 0≤a≤0.142, 0≤b≤0.165, 0.365≤c≤0.584, 0.022≤d≤0.076, or in yet another embodiment, in the ranges 0≤a≤0.133, 0≤b≤0.154, 0.374≤c≤0.564, 0.026≤d≤0.059. The composition may be mixed phase material with other crystalline phases identified by XRD peaks at 2θ=20.2°±0.50° and 23.6°±0.50° and/or peaks at 2θ=21.0°±0.50° and 28.0°±0.50°, and/or peaks at 17.5°±0.50° and 18.2°±0.50°, and/or peaks at 17.8°±0.50° and 21.8°±0.50°. The compositions may contain a crystalline phase associated with one or more lithium halides. The solid electrolyte material may comprise at least one of glass ceramic phases, crystalline phases and mixed phases.

An exemplary solid electrolyte material comprises Li, T, X and A wherein T is at least one element selected from the group consisting of P, As, Si, Ge, Al, Sb, W, and B; X is at least one element selected from the group consisting of F, Cl, Br, I and N; and A is one or more of S or Se; wherein the solid electrolyte material has peaks at 14.9°±0.50°, 20.4°±0.50°, and 25.4°±0.50° in X-ray diffraction measurement with Cu—Kα(1,2)=1.5418 Å.

In another embodiment, the solid electrolyte material comprises a formula Li$_{1-a-b-c-d}$P$_a$T$_b$A$_c$X$_d$ wherein 0≤a≤0.150, 0≤b≤0.176, 0.364≤c≤0.603, and 0.019≤d≤0.080.

In yet another embodiment, the solid electrolyte material comprises a formula Li$_{1-a-b-c-d}$R$_a$T$_b$A$_c$X$_d$ wherein a=0.130, b=0, c=0.478, d=0.043, A=S, and X=Br and I in a 1:4 ratio by mol.

In still another embodiment, the solid electrolyte material comprises a formula Li$_{1-a-b-c-d}$P$_a$T$_b$A$_c$X$_d$, wherein a=0.130, b=0, c=0.478, d=0.043, A=S, and X=Br and I in a 1:4 ratio by mol.

In another embodiment, the solid electrolyte material comprises a formula Li$_{1-a-b-c-d}$P$_a$T$_b$A$_c$X$_d$, wherein mixed phases may comprise crystalline phases containing peaks at 20.2°±0.50° and 23.6°±0.50°, and/or 21.0°±0.50° and 28.0°±0.50°, and/or 17.5°±0.50° and 18.2°±0.50°, and/or peaks at 17.8°±0.50° and 21.8°±0.50° in X-ray diffraction measurement with Cu—Kα(1,2)=1.5418 Å.

In another embodiment, the solid electrolyte material comprises a formula Li$_{1-a-b-c-d}$P$_a$T$_b$A$_c$X$_d$ wherein a ratio of peak intensity at 20.4°±0.50° to a peak at 21.0°±0.50° is 1 or more.

An exemplary subset of compositions can be defined by Li$_{1-a-b-c-d}$P$_a$T$_b$A$_c$X$_d$ where the subscript b=0. Compositions may be in the range of 0.111≤a≤0.150, b=0, 0.444≤c≤0.513, 0.024≤d≤0.069, or in another embodiment, 0.118≤a≤0.142, b=0, 0.452≤c≤0.501, 0.028≤d≤0.066, or in yet another embodiment, 0.128≤a≤0.133, b=0, 0.470≤c≤0.489, 0.033≤d≤0.051.

An exemplary composition is defined by Li$_{1-a-b-c-d}$P$_a$T$_b$A$_c$X$_d$ where a=0.130, b=0, c=0.478, d=0.043, A=S, and X=Br and I in a 1:4 ratio by mol. Such a composition, after heat treatment, yields the crystalline phase of the present disclosure. The structure of this crystalline phase is conducive to high ionic conductivity, and the presence of halogens may aid in the formation of stable, low-resistance interfaces against lithium metal and high voltage cathode active materials.

Figure 3:
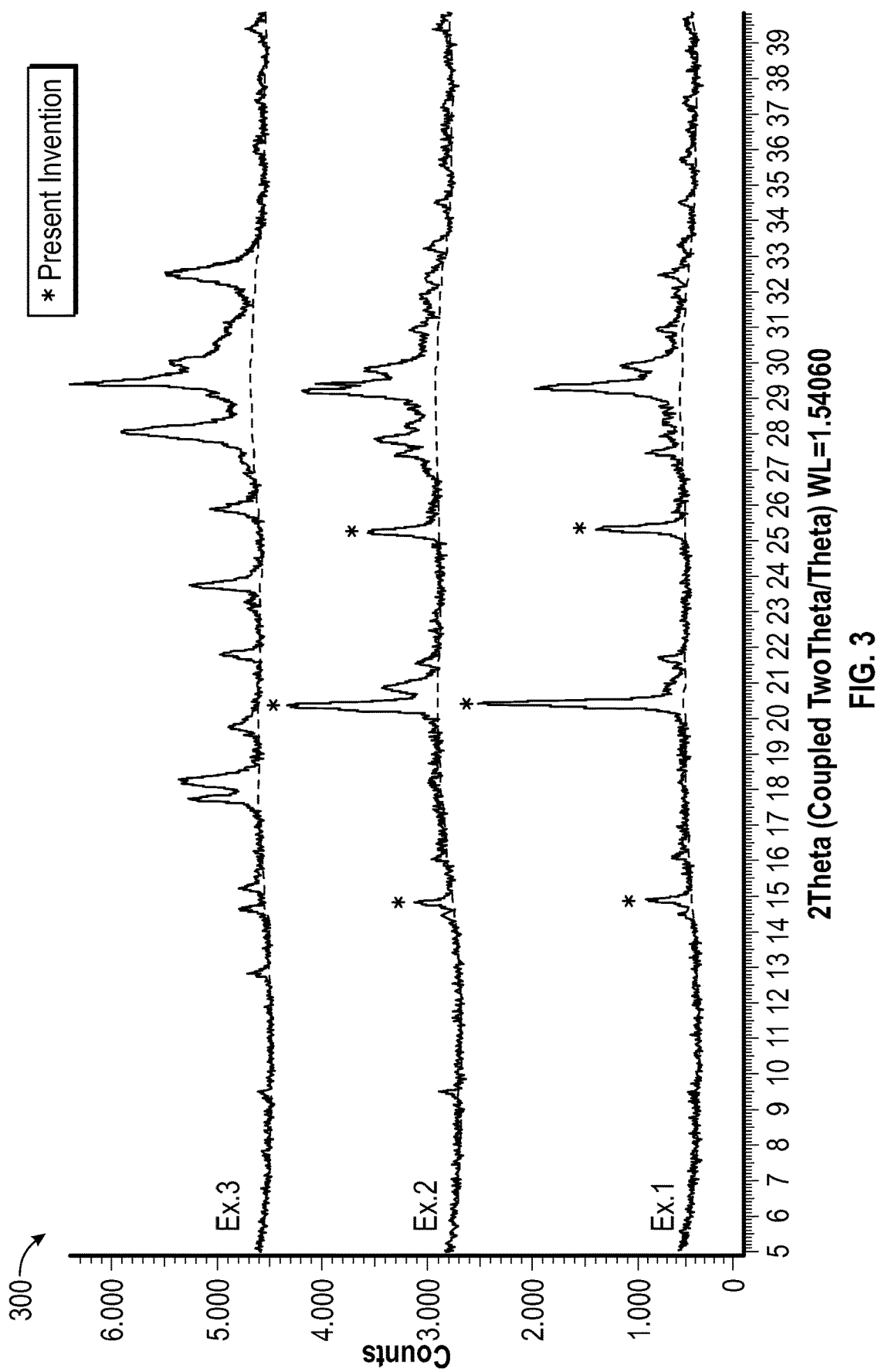
FIG. 3 is a plot of X-ray diffraction measurements of a solid electrolyte composition produced by the process indicated in FIG. 2, in accordance with an embodiment.

FIG. 3 is a plot of X-ray diffraction measurements of a solid electrolyte composition produced by the process indicated in FIG. 2, according to Example 1. X-ray diffraction (XRD) measurements show dominant novel peaks indicative of a previously unknown crystalline phase at 14.9°±0.50°, 20.4°±0.50°, and 25.4°±0.50° with Cu—Kα(1,2)=1.5418 Å. Other compositions may be mixed-phase material with other crystalline phases identified by XRD peaks at 2θ=20.2°±0.50° and 23.6°±0.50° and/or peaks at 2θ=21.0°±0.50° and 28.0°±0.50°, and/or peaks at 17.5°±0.50° and 18.2°±0.50°, and/or peaks at 17.8°±0.50° and 21.8°±0.50°, and/or peaks associated with one of more lithium halides.

An exemplary embodiment is lithium solid-state battery comprising a positive electrode active material layer containing a positive electrode active material; a negative electrode active material layer containing a negative electrode active material; and a solid electrolyte layer disposed between the positive electrode active material layer and the negative electrode active material layer, wherein at least one of the positive electrode active material layer, the negative electrode active material layer, and the solid electrolyte layer comprises A solid electrolyte material comprising Li, T, X and A wherein T is at least one element selected from the group consisting of P, As, Si, Ge, Al, Sb, W, and B; X is at least one element selected from the group consisting of F, Cl, Br, I and N; and A is one or more of S or Se; wherein the solid electrolyte material has peaks at 14.9°±0.50°, 20.4°±0.50°, and 25.4°±0.50° in X-ray diffraction measurement with Cu—Kα(1,2)=1.5418 Å.

Measured examples of the compositions described herein provide conductivities of approximately above 0.4 mS/cm or 0.5 mS/cm at room temperature for pure and mixed-phase electrolyte material in pellets compressed at room temperature. Higher conductivities may possibly be attained by an altered chemical stoichiometry and/or by compression at elevated temperatures or other processing methods and conditions.

Features described above as well as those claimed below may be combined in various ways without departing from the scope hereof. It should thus be noted that the matter contained in the above description or shown in the accompanying drawings should be interpreted as illustrative and not in a limiting sense. The above-described embodiments should be considered as examples of the present invention, rather than as limiting the scope of the invention. In addition to the foregoing embodiments of inventions, review of the detailed description and accompanying drawings will show that there are other embodiments of such inventions. Accordingly, many combinations, permutations, variations and modifications of the foregoing embodiments of inventions not set forth explicitly herein will nevertheless fall within the scope of such inventions. The following claims are intended to cover generic and specific features described herein, as well as all statements of the scope of the present method and system, which, as a matter of language, might be said to fall there between.

What is claimed is:

1. A solid electrolyte material comprising:
   Li, T, X and A wherein T is at least one element selected from the group consisting of P, As, Si, Ge, Al, Sb, W, and B; X is at least one element selected from the group consisting of F, Cl, Br, I and N; and A is one or more of S or Se;
   wherein the solid electrolyte material has peaks at 14.9°±0.50°, 20.4°±0.50°, and 25.4°±0.50° in X-ray diffraction measurement with Cu—Kα(1,2)=1.5418 Å, and wherein the peak at 20.4°±0.50° has the highest intensity in a range from 5° to 40° in the X-ray diffraction measurement.

2. The solid electrolyte material of claim 1, further comprising at least one of glass ceramic phases, crystalline phases and mixed phases.

3. The solid electrolyte material of claim 1, the solid electrolyte material having a formula:
   $Li_{1-a-b-c-d}P_aT_bA_cX_d$ wherein 0≤a≤0.150, 0≤b≤0.176, 0.364≤c≤0.603, and 0.019≤d≤0.080.

4. The solid electrolyte material of claim 3, wherein a=0.130, b=0, c=0.478, d=0.043, A=S, and X=Br and I in a 1:4 ratio by mol.

5. The solid electrolyte material of claim 1, wherein mixed phases comprise crystalline phases containing peaks at:
   20.2°±0.50° and 23.6°±0.50°; or
   21.0°±0.50° and 28.0°±0.50°; or
   17.5°±0.50° and 18.2°±0.50°; or
   peaks at 17.8°±0.50° and 21.8°±0.50° in X-ray diffraction measurement with Cu—Kα(1,2)=1.5418 Å.

6. The solid electrolyte material of claim 5, wherein a ratio of peak intensity at 20.4°±0.50° to a peak at 21.0°±0.50° is 1 or more.

7. A lithium solid-state battery comprising a positive electrode active material layer containing a positive electrode active material; a negative electrode active material layer containing a negative electrode active material; and a solid electrolyte layer disposed between the positive electrode active material layer and the negative electrode active material layer, wherein at least one of the positive electrode active material layer, the negative electrode active material layer, and the solid electrolyte layer comprises a solid electrolyte material comprising Li, T, X and A wherein T is at least one element selected from the group consisting of P, As, Si, Ge, Al, Sb, W, and B; X is at least one element selected from the group consisting of F, Cl, Br, I and N; and A is one or more of S or Se; wherein the solid electrolyte material has peaks at 14.9°±0.50°, 20.4°±0.50°, and 25.4°±0.50° in X-ray diffraction measurement with Cu—Kα(1,2)=1.5418 Å, wherein the peak at 20.4°±0.50° has the highest intensity in a range from 5° to 40° in the X-ray diffraction measurement.

8. A method for producing a sulfide solid electrolyte material including glass ceramics comprising Li, T, X and A wherein T is at least one element selected from a group consisting of P, As, Si, Ge, Al, Sb, W, and B; X is at least one element selected from a group consisting of F, Cl, Br, I and N; A is one or more of elements S or Se; the method comprising:
   (a) mixing and milling a raw material composition containing an element A or compound $Li_2A$, an element T or sulfide of T, and a compound LiX or $Li_3N$ to render the mixture an amorphous sulfide glass under x-ray diffraction; and
   (b) heating the sulfide glass at a heat treatment temperature equal to or greater than a crystallization temperature of the sulfide glass to synthesize the glass ceramics having peaks at 14.9°±0.50°, 20.4°±0.50°, and 25.4°±0.50° in X-ray diffraction measurement with Cu—Kα(1,2)=1.5418 Å, wherein the peak at 20.4°±0.50° has the highest intensity in a range from 5° to 40° in the X-ray diffraction measurement.

* * * * *